United States Patent [19]

Sakamoto

[11] Patent Number: 4,535,365

[45] Date of Patent: Aug. 13, 1985

[54] METHOD AND APPARATUS FOR POSITIONING ORIGINAL PICTURES INTO A TRANSPARENT SHEET TO BE MOUNTED TO A PICTURE CYLINDER OF A PICTURE REPRODUCING MACHINE

[75] Inventor: Takashi Sakamoto, Kyoto, Japan

[73] Assignee: Dainippon Screen Seizo Kabushiki Kaisha, Kyoto, Japan

[21] Appl. No.: 427,292

[22] Filed: Sep. 29, 1982

[30] Foreign Application Priority Data

Sep. 29, 1981 [JP] Japan .................. 56-153065
Sep. 29, 1981 [JP] Japan .................. 56-153066

[51] Int. Cl.³ ............................................. H04N 1/18
[52] U.S. Cl. ................................................. 358/287
[58] Field of Search ............... 358/287, 285, 289, 291, 358/292

[56] References Cited

U.S. PATENT DOCUMENTS 2,115,894  5/1938  Watson .................. 358/260
4,268,869  5/1981  Heyer .................... 358/287
4,327,380  4/1982  Yamada .................. 358/287
4,417,805  11/1983  Kishi ..................... 358/287

Primary Examiner—Howard W. Britton
Attorney, Agent, or Firm—Zarley, McKee, Thomte, Voorhees & Sease

[57] ABSTRACT

A method and apparatus for positioning original pictures onto a transparent sheet to be mounted to a picture cylinder of a picture reproducing machine such as a color scanner, wherein original pictures are positioned properly onto a transparent sheet by using pairs of cursors moving X- and Y-directions so that reproduction pictures of the trimming parts of the original pictures may be recorded in the predetermined layout positions and orientations, with the result of data for expressing sizes of the trimming parts of the original pictures, reproduction scales, and sizes of the reproduction pictures which will be input to a processor of the picture reproducing machine. Thus the obtained transparent sheet together with the original pictures mounted thereon is mounted to a picture cylinder of the picture reproducing machine.

12 Claims, 7 Drawing Figures

METHOD AND APPARATUS FOR POSITIONING ORIGINAL PICTURES INTO A TRANSPARENT SHEET TO BE MOUNTED TO A PICTURE CYLINDER OF A PICTURE REPRODUCING MACHINE

BACKGROUND OF THE INVENTION

The present invention relates to a method and apparatus for positioning original pictures onto a transparent sheet to be mounted to a picture cylinder of a picture reproducing machine such as a color scanner and a color facsimile.

In a conventional layout scanner or the like, in order to edit reproduction pictures, such as trimming, layout, enlargement, reduction, and so forth, of the reproduction pictures, original pictures are scanned photoelectrically to obtain color separation picture signals of primary colors, and then the color separation picture signals are stored in a memory. Then, the coordinates of the color separation picture signals read out of the memory are transformed depending on the specified layout data.

In this embodiment, when the scanning is carried out by 500 lines of pitches per one inch in X and Y directions and a finish size is about 20 inches $\times$ 28 inches, the total picture data for four colors of cyan C, magenta M, yellow Y and black B amounts to $560 \times 10^6$ picture elements. Now, when each picture element has 256 steps (8 bits) of gradation, the picture data for the finish size requires approximately 560 megabytes.

For storing such picture data, a large scale memory using a magnetic disc or a magnetic tape is required. Further, when the rotations of the coordinates or the chages of the reproduction scales of the reproduction pictures which are once stored in the memory by means of the picture data, because of a large amount of data, a very long time is required or a processing circuit of high cost for exclusive use is necessary.

SUMMARY OF THE INVENTION

It is an object of the present invention to provide a method for positioning original pictures onto a transparent sheet to be mounted to a picture cylinder of a picture reproducing machine, free from the aforementioned defects and inconveniences, which is capable of mounting the original pictures via the transparent sheet to the picture cylinder exactly and quickly with their desired orientations and layout without requiring the rotations and the magnification changes of the picture images which are once stored in a memory.

It is another object of the present invention to provide an apparatus for positioning original pictures onto a transparent sheet to be mounted to a picture cylinder of a picture reproducing machine, free from the aforementioned defects and inconveniences, which is capable of mounting the original pictures via the transparent sheet to the picture cylinder exactly and quickly with their desired orientations and layout without requiring the rotations and the magnification changes of the picture images which are once stored in a memory.

It is still another object of the present invention to provide a method for positioning original pictures onto a transparent sheet to be mounted to a picture cylinder of a picture reproducing machine such as a color scanner, in which the editorial work of the reproduction pictures are readily performed at will by electronically giving the sizes, the positions and the magnifications of the reproduction pictures, which are determined exactly in advance, to the picture reproducing machine, with the result of recording the reproduction pictures.

It is further object of the present invention to provide an apparatus for positioning original pictures onto a transparent sheet to be mounted to a picture cylinder of a picture reproducing machine such as a color scanner, in which the original pictures are mounted to the transparent sheet in the desired layout positions, and the necessary data for controlling the picture reproducing machine during the picture reproduction can be electronically obtained and be stored in recording means.

According to the present invention there is provided a method for positioning original pictures onto a transparent sheet to be mounted to a picture cylinder of a picture reproducing machine, comprising the steps of (a) positioning original pictures onto a transparent sheet properly in the desired layout positions depending on the predetermined trimmings and orientations of the original pictures, in order to input at least two of data for expressing sizes of parts to be reproduced of the original pictures, reproduction scales, and sizes of finished reproduction pictures, into a processor of the picture reproducing machine, and (b) mounting the transparent sheet on which the original pictures are mounted, onto a picture cylinder of the picture reproducing machine.

According to the present invention there is also provided an apparatus for positioning original pictures onto a transparent sheet to be mounted to a picture cylinder of a picture reproducing machine, comprising (a) a transparent plate, (b) a pair of X-cursors which are arranged in parallel under the transparent plate and extend in Y-direction, and which are movable in X-direction independently, (c) a pair of Y-cursors which are arranged in parallel under the transparent plate and extend in the X-direction, and which are movable in the Y-direction dependently, (d) diffuse illumination means positioned under the transparent plate and the cursors, (e) means for measuring coordinates of the cursors with reference to standard lines, and (f) arithmetic means which inputs values expressing coordinates of layout positions of finished reproduction pictures, and two of values expressing the coordinates of the outlines measured by the cursors, which represent the sizes of the finished reproduction pictures, coordinates of outlines measured by the cursors, which represent sizes of parts to be reproduced of the original pictures and reproduction scales, and which outputs data for reproducing the reproduction pictures.

BRIEF DESCRIPTION OF THE DRAWINGS

In order that the present invention may be better understood, preferred embodiments thereof will be described with reference to the accompanying drawings, in which.

DESCRIPTION OF THE PREFERRED EMBODIMENTS

Figure 1:
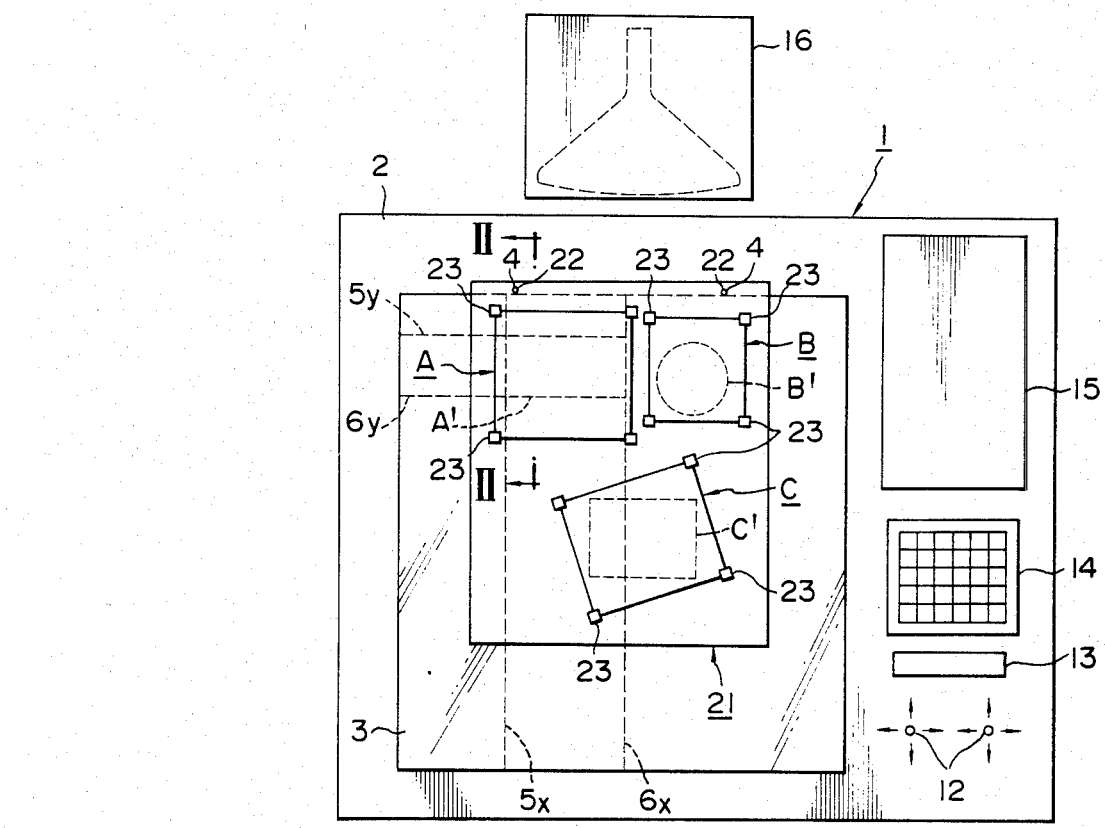
FIG. 1 is a top plan view of an apparatus according to the present invention.
Figure 2:
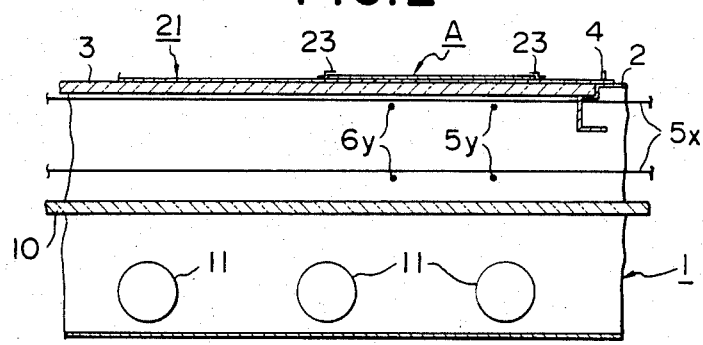
FIG. 2 is an enlarged fragmentary longitudinal cross section, taken along the line II—II of FIG. 1.

Referring to the drawings there is shown in FIGS. 1 and 2 an apparatus 1 for positioning original pictures onto a transparent sheet according to the present invention.

On a top plate 2 of the apparatus 1 a transparent plate 3 made of a rectangular glass plate or the like is horizontally mounted. A pair of register pins 4 are mounted upright in the upper side of the top plate 2 adjacent to the transparent plate 3 and are aligned in parallel with each other in the right-left direction or X-direction.

Under the transparent plate 3 two pairs of left and right X-cursors 5x and 6x made of piano wires or acrylic resin plates havrng a mark line cut thereon, each pair aligning vertically in parallel, are arranged in parallel horizontally and extend in the front-rear direction or Y-direction. Under the transparent plate 3 two pairs of rear and front Y-cursors 5y and 6y made of the same material as the X-cursors, each pair aligning vertically in parallel, are also arranged in parallel horizontally and extend in the right-left direction or X-direction perpendicular to the Y-direction.

Figure 3:
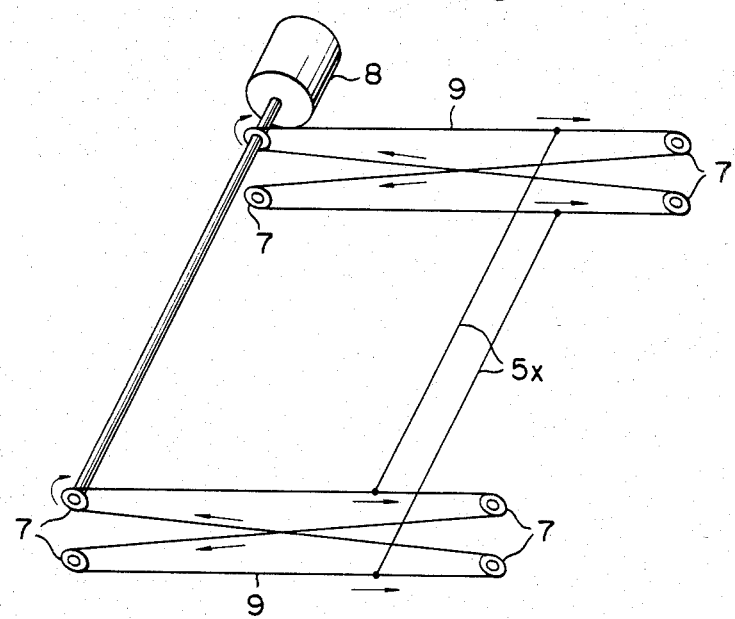
FIG. 3 is a perspective view of a mechanism for moving cursors shown in FIG. 1.

In FIG. 3 there is shown a mechanism for moving the cursors. Four pairs of pulleys 7 are arranged in two stages, in eight corners of an imaginary rectangular solid. One pair of pulleys are mounted to a drive shaft which is driven by a motor 8 connected thereto.

A pair of front and rear wires 9 are extended to the four front and the four rear pulleys 7, as shown in FIG. 3. The X-cursors 5x aligned in parallel vertically are connected to the upper and the lower extensions of the front and the rear wires 9. Hence, the X-cursors 5x can be moved in parallel in the X-direction by driving the motor 8.

The other cursors 6x, 5y and 6y are movable in the same manner as the X-cursors 5x, in the X- and the Y-directions.

Under the cursors 5x, 6x, 5y and 6y a light diffusion plate 10 made of a pearl glass or the like, is horizontally mounted, and under the light diffusion plate 10 a plurality of light sources 11 such as fluorescent lamps are arranged.

In the right front part of the top plate 2 two joystick switches 12 for moving the X-cursors and the Y-cursors are disposed. A plurality of measuring means (not shown) such as encoders or pulse motors for measuring coordinates of the cursors 5x, 6x, 5y and 6y with reference to standard lines, for example, the left and the rear edge lines of the transparent plate 3, or the like, a display means 13 which displays the coordinates measured, a key board 14 which inputs the data of the sizes of the trimming parts of the original pictures, the sizes of the finished reproduction pictures, the reproduction scales, and so forth, into the apparatus, arithmetic means (not shown) which calculates the reproduction scales from the coordinates values of the cursors 5x, 6x, 5y and 6y, the sizes of the finished reproduction pictures from the trimming parts of the original pictures and the reproduction scales, and the sizes of the trimming parts of the original pictures from the sizes of the finished reproduction pictures and the reproduction scales, and a recording means 15 such as a paper tape puncher which stores the calculation results of the arithmetic means for inputting it to a processor of the layout scanner, are arranged in the right part of the top plate 2. A monitor 16 which displays the positions of the cursors 5x, 6x, 5y and 6y, the reproduction scales, and so forth, is provided to the rear end of the apparatus 1.

Figure 4:
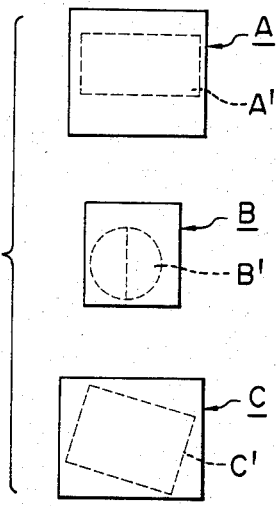
FIG. 4 shows original pictures to be mounted to the apparatus of FIG. 1.

There are shown original pictures A, B and C in FIG. 4, together with their trimming parts A', B' and C', respectively, as shown by broken lines.

Figure 5:
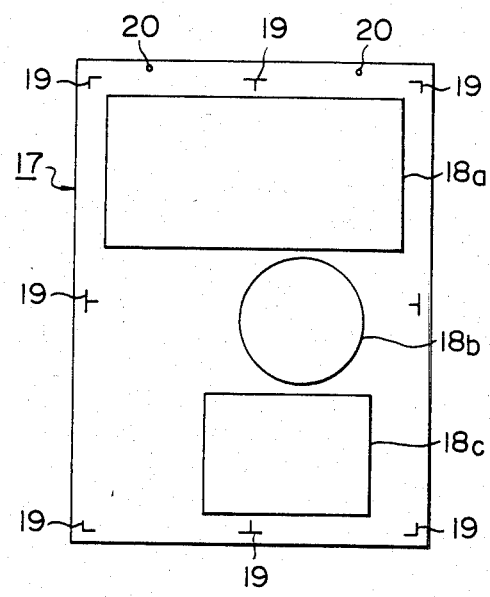
FIG. 5 shows a layout sheet used for the apparatus of FIG. 1.

In FIG. 5 there is shown a layout sheet 17 of which outlines 18a, 18b and 18c defining exact sizes and positions of finished reproduction pictures obtained from the trimming parts A', B' and C' of the original pictures A, B and C, are drawn. Register marks 19 are attached to the surroundings of the layout sheet 17, and a pair of register holes 20 are formed in the top end of the layout sheet 17.

Figure 6:
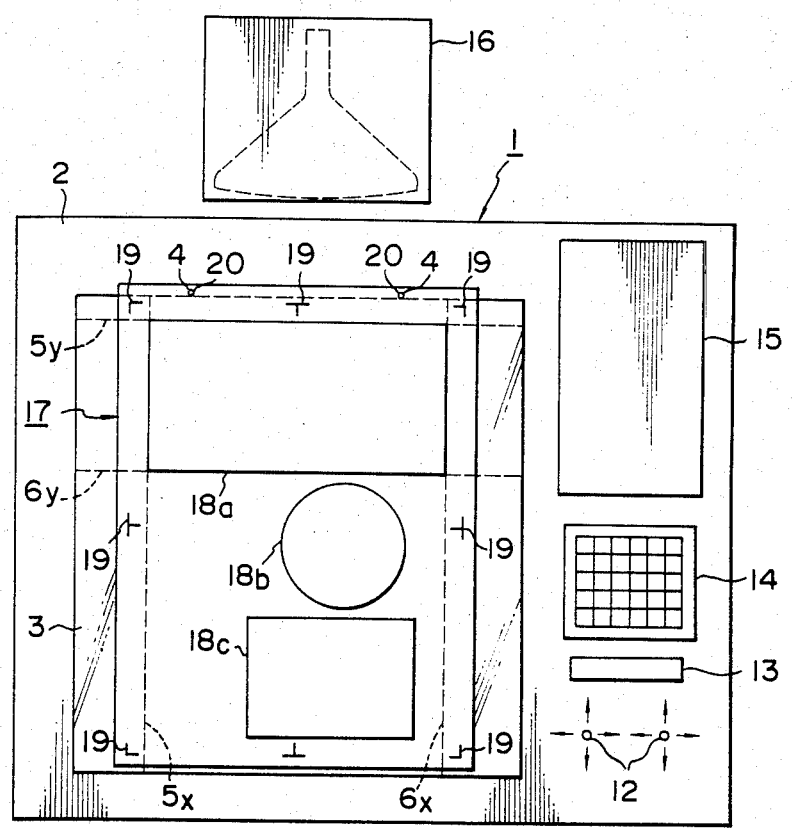
FIG. 6 is a top plan view of an apparatus according to the present invention, on which a layout sheet is mounted.

The layout sheet 17 is positioned on the transparent plate 3 of the apparatus 1 by fitting its register holes 20 onto the register pins 4, as shown in FIG. 6. Then, the cursors 5x, 6x, 5y and 6y are moved to become coincident with the four sides of the oblong outline 18a, and the coordinates $X_1$, $X_2$, $Y_1$ and $Y_2$ of these four sides are displayed on the display means 13 and are stored into the arithmetic means by using the key board 14. Then, the coordinates of the four sides of the outline 18c are displayed on the display means 13 and are stored into the arithmetic means in the same manner as the outline 18a, and regarding the outline 18b the coordinates of its center and radius are stored in the arithmetic means in the similar manner to the outline 18a.

In this embodiment, the layout sheet 17 may be opaque as well as transparent, and when these data described above are already known, such data can be directly input to the arithmetic means by using the key board 14 without the layout sheet 17.

Then, the layout sheet 17 is demounted from the transparent plate 3, and then a transparent sheet 21 is positioned on the transparent plate 3 by fitting its register holes 22 formed in the upper end, onto the register pins 4, and is temporally mounted to the transparent plate 3.

Next, the original pictures A, B and C are temporally positioned on the transparent sheet 21 in the proper positions, and then the orientations of the trimming parts A', B' and C' of the original pictures A, B and C are adjusted by using the cursors 5x or 6x and 5y or 6y so as to be upright similar to those of the outlines 18a, 18b and 18c of the layout sheet 17. Then, the original pictures are mounted to the transparent sheet 21 by adhesive tapes 23 or the like. In this operation, since the cursors 5x, 6x, 5y or 6y are aligned vertically in pair in parallel under the transparent plate 3, the positioning of the original pictures A, B and C can be performed readily, and no binocular parallax causes.

Then, the coordinates $x_1$, $x_2$, $y_1$ and $y_2$ of the four sides of the outline of the oblong trimming part A' of the original picture A with reference to the standard lines described above are measured by using the cursors 5x, 6x, 5y and 6y, and are displayed on the display means 13. In the same time, the coordinates measured are input to the arithmetic means by using the key board 14, in the same manner as the layout sheet 17 described above.

In the arithmetic means, the reproduction scales mx and my of the outline 18a, i.e. the finished reproduction picture, of the layout sheet 17 as compared with the trimming part A′ of the original picture A in the X- and the Y-directions are obtained from their input coordinates $x_1$, $x_2$, $y_1$, $y_2$, $X_1$, $X_2$, $Y_1$ and $Y_2$ in the following formulae, and are displayed in the monitor 16.

$$mx = \frac{X_2 - X_1}{x_2 - x_1}$$

$$my = \frac{Y_2 - Y_1}{y_2 - y_1}$$

When the obtained reproduction scales mx and my in the X- and the Y-directions are not coincident with each other, one of these two values is selected.

Then, the reproduction scales in the X- and the Y-directions with respect to the trimming parts B′ and C′ of the original pictures B and C and their reproduction pictures are obtained in the same manner as described above.

Thus the obtained reproduction scales such as mx and my, the trimming data such as the coordinates $x_1$, $x_2$, $y_1$ and $y_2$ or $X_1$, $X_2$, $Y_1$ and $Y_2$, and so forth, are recorded in a punch paper tape by the paper tape puncher 15.

Figure 7:
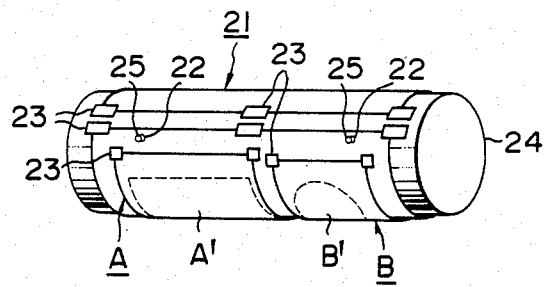
FIG. 7 is a perspective view of a picture cylinder of a layout scanner, on which a transparent sheet together with the original pictures mounted thereon is secured.

Then, the transparent sheet 21 together with the original pictures mounted thereon in the manner described above is released from the apparatus 1, and is mounted onto a picture cylinder 24 of the layout scanner by fitting its register holes 22 onto a pair of register pins 25 which are provided to the picture cylinder 24 in the same manner as the register pins 4 of the apparatus 1, that is, aligning at the predetermined distance in the direction of the cylinder's axis, as shown in FIG. 7.

Next, the data recorded in the punch paper tape is input to a processor of the layout scanner, and the trimming parts A′, B′ and C′ of the original pictures A, B and C are consecutively scanned photoelectrically in the conventional manner to record the reproduction pictures on the photosensitive material mounted to a recording cylinder in the predetermined positions of the outlines 18a, 18b and 18c of the layout sheet 17 exactly with the desired sizes, reproduction scales, layout and orientations of the reproduction pictures.

Although in the embodiment described above the trimming parts of the original pictures and the sizes of the finished reproduction pictures are predetermined, however, according to the present invention, the trimming of the original pictures can be carried out according to the sizes of the finished reproduction pictures and the reproduction scales. In such an embodiment, since the values $x_2-x_1$ and $y_2-y_1$ can be calculated in advance, the trimming of the original pictures is performed by moving the cursors 5x, 6x, 5y and 6y to the predetermined positions depending on the calculated values.

Although the present invention has been described in some detail by way of illustration and example for purposes of clarity of understanding, it will, of course, be understood that various changes and modifications may be made in the form, details, and arrangement of the parts without departing from the scope of the present invention.

What is claimed is:

1. A method for arranging substantially transparent originals on a picture cylinder suitable for recording in a predetermined layout, comprising the steps of:
    (A) setting a transparent sheet to a transparent plate at a predetermined positional relation therebetween,
    (B) positioning the originals on said transparent sheet by using X and Y cursors so that orientations of parts to be reproduced of originals are respectively consistent with those of reproduction images,
    (C) fixing said originals on said transparent sheet at respective positions positional in said step (B),
    (D) mounting said transparent sheet onto the picture cylinder.

2. A method as defined in claim 1, further comprising previous to the step (A), the step of:
    (A′) drafting outlines which define exact sizes and positions of reproduction images on a substantially transparent material,
    (B′) setting said transparent material to a positioning means at a predetermined positioning relation therebetween,
    (C′) measuring the positions of said outlines by means of the X and Y cursors,
    (D′) storing the position data measured in said step (C′) into a memory means, and
    (E′) removing said transparent material from said positioning means.

3. A method as defined in claim 1, further comprising the steps of:
    (A″) inputting the position data of outlines which define exact sizes and positions of reproduction images on a substantially opaque sheet, by means of input keys,
    (B″) storing the position data measured in step (C′) into a memory means, and to find corresponding position data of desired parts of the originals,
    (C″) storing said corresponding position data of desired parts of the originals into memory means.

4. A method as defined in claim 2, wherein the step (B) is performed on the basis of position data stored in the step (D′).

5. A method as defined in claim 3, wherein the step (B) is performed on the basis of position data stored in the step (C″).

6. A method as defined in claim 1, further comprising between the steps (B) and (C), the step of: measuring the positions of the originals on the transparent sheet by means of the X and Y cursors.

7. A method as defined in claim 1, further comprising, between the steps (C) and (D), the steps of: measuring the positions of the originals on the transparent sheet by means of the X and Y cursors.

8. A method as defined in claim 6 or 7, further comprising the steps of: storing the position data of the originals into a memory means.

9. A method as defined in claim 8, further comprising the step of: processing two of data expressing sizes of parts to be reproduced of the originals, reproduction magnifications, and sizes of reproduction images, by a processor means, so as to automatically perform scanning-recording operation.

10. An apparatus for arranging substantially transparent picture originals onto a transparent sheet to be mounted on a picture cylinder, suitable for recording in a predetermined layout, comprising:
    (A) a transparent plate having a fixing means by which the transparent sheet is fixedly set thereon at a predetermined positional relation therebetween,
    (B) positioning means for positioning the originals on said transparent sheet in reference therewith, said means including at least of Y cursors which extend respectively in X and Y direction in said transparent plate, and which are movable in respective directions independently, and (C) diffuser means for diffusing illumination from light source means, said diffuser means being provided under said positioning means.

11. An apparatus as defined in claim 10 further comprising:
(D) measuring means for measuring the position of the originals, relative to the transparent sheet and transparent plate, on the basis of the coordinates of the X and Y cursors, and (E) memory means for storing the position data of the originals obtained by said measuring means.

12. An apparatus as defined in claim 11, further comprising: processor means for processing two of data expressing sizes parts to be reduced of the originals, reproduction magnifications, and sizes of reproduction images, so as to automatically perform scanning-recording scales.

* * * * *